May 23, 1967 — C. J. STALEGO — 3,320,999
INTERNAL COMBUSTION BURNER
Original Filed June 21, 1961 — 3 Sheets-Sheet 1
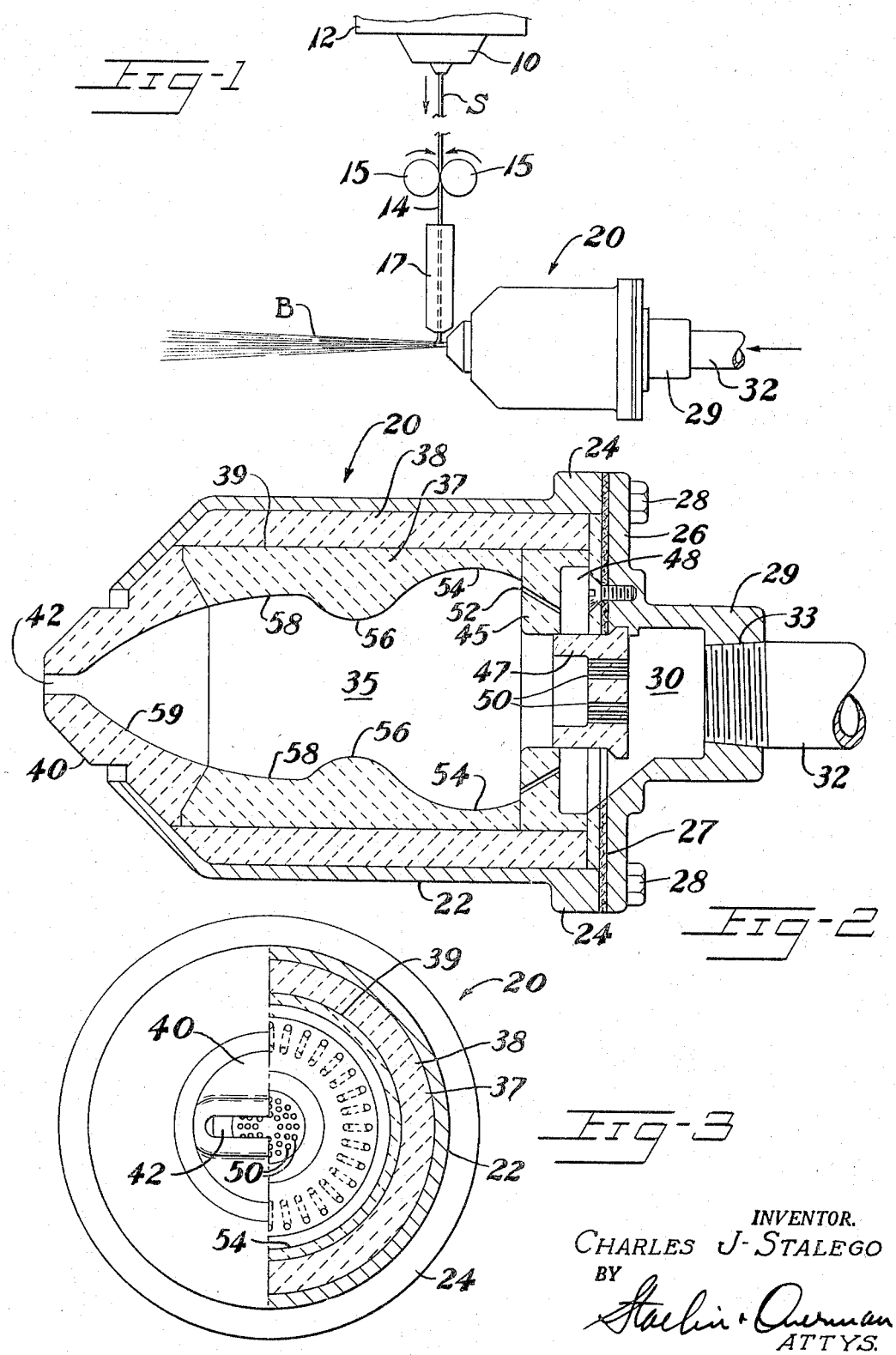
INVENTOR.
CHARLES J. STALEGO
BY
ATTYS.

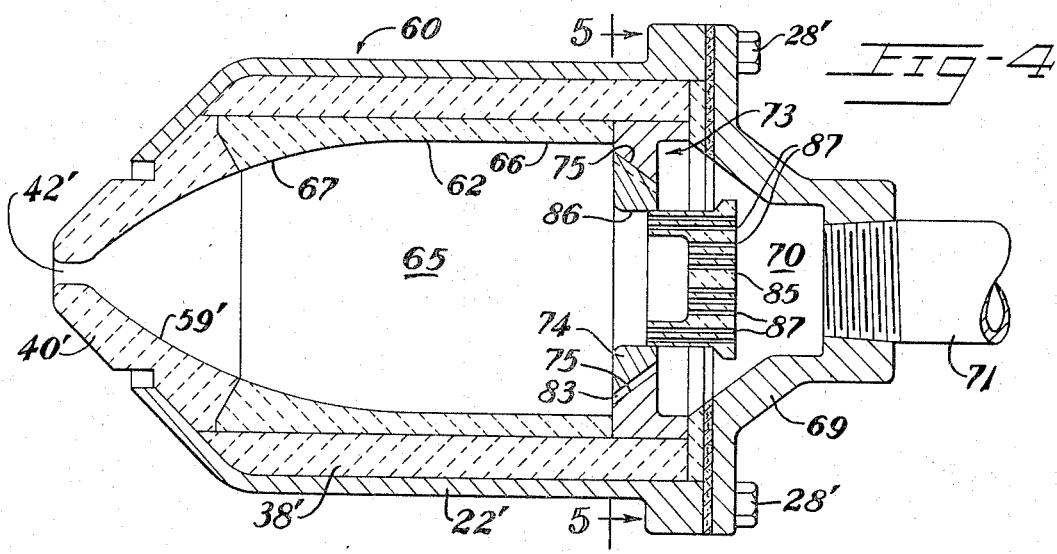
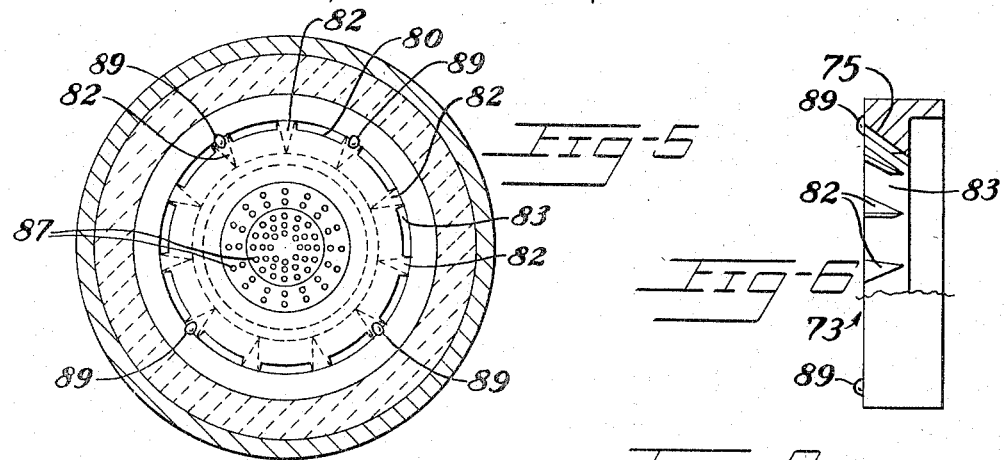
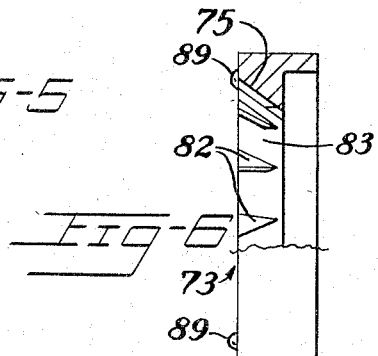
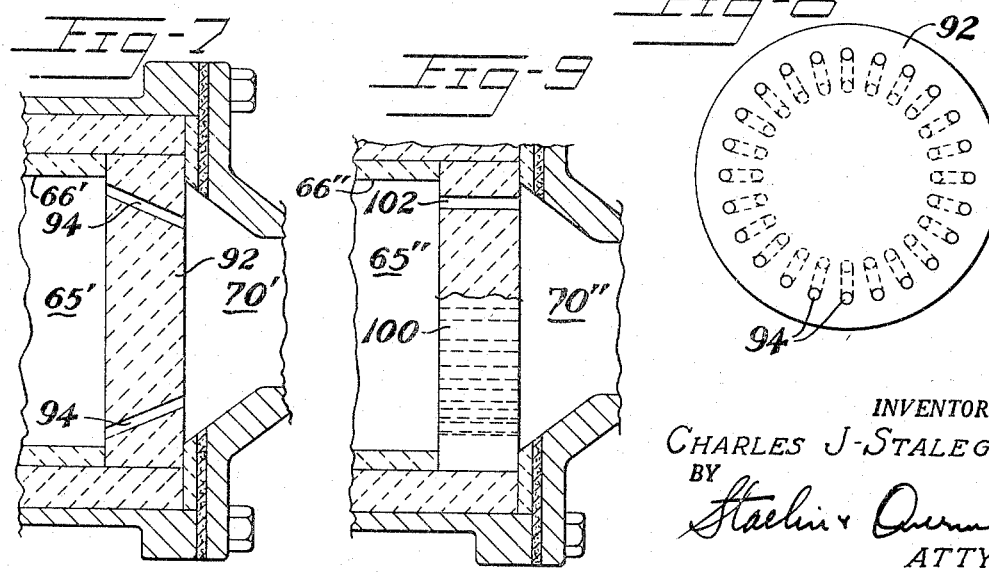
INVENTOR.
CHARLES J. STALEGO
BY
ATTYS.

May 23, 1967 C. J. STALEGO 3,320,999
INTERNAL COMBUSTION BURNER
Original Filed June 21, 1961 3 Sheets-Sheet 3

INVENTOR.
CHARLES J. STALEGO
BY
Stalling & Overman
ATTYS.

United States Patent Office 3,320,999
Patented May 23, 1967

3,320,999
INTERNAL COMBUSTION BURNER
Charles J. Stalego, Newark, Ohio, assignor to Owens-Corning Fiberglas Corporation, a corporation of Delaware
Application June 21, 1961, Ser. No. 118,635, which is a division of application Ser. No. 401,250, Dec. 30, 1953. Divided and this application Mar. 15, 1965, Ser. No. 439,894
8 Claims. (Cl. 158—99)

This application is a division of my copending application, Ser. No. 118,635, filed June 21, 1961, now abandoned, which is a division of my application, Ser. No. 401,250, filed Dec. 30, 1953, now abandoned.

The invention relates to a method of burning combustible mixtures in a confined zone or chamber and a burner construction of the internal-combustion type for carrying out the method.

Internal-combustion burners, wherein a combustible mixture is burned within a confined zone and the burned gases or products of combustion are discharged from the burner chamber through a restricted orifice to form an intensely hot, high velocity blast, have been utilized extensively in attenuating heat-softenable mineral materials to fibers. In such methods of fiber formation, bodies of glass or other heat-softenable material are fed or delivered into the high velocity blast near the burner orifice, the heat of the blast softening the material and the softened material attenuated to fine fibers by the force of the blast. A burner of the internal-combustion type particularly usable for the mentioned purpose is disclosed in my patent No. 2,489,243, dated Nov. 22, 1949. In a burner of the type shown in the patent and used for fiber-attenuating purposes, the combustion chamber is formed with a cylindrical wall portion which is reduced in cross section as it approaches the nose end of the burner in which is formed an orifice of a cross-sectional area of from one-eighth to one-quarter of the cross-sectional area of the burner chamber through which the gases are discharged. The rear portion of such burner is connected with a supply of combustible mixture, such as a mixture of fuel gas and air, which is admitted into the combustion chamber of the burner through a fire screen in the form of a wall provided with a plurality of small openings or passageways grouped adjacent the axis of the burner chamber adapted to admit combustible mixture into the central zone of the chamber. The manner of introducing the combustible mixture at the central zone of the combustion chamber results in the establishment of an annular zone or pocket surrounding the incoming mixture in which little or no combustion takes place as the adjacent wall of the combustion chamber is comparatively cool, a condition which impairs the rate of flame propagation and combustion of the mixture. Under these operating conditions, the amount of mixture that can be satisfactorily burned within the chamber is necessarily limited. Therefore, the velocity of the gases forming the blast extruded through the orifice is necessarily restricted by the rate of burning of combustible mixture within the chamber.

The present invention relates to improvements in burners of the internal-combustion type wherein a mixture of combustible gases is admitted into a burner chamber or confined zone in a manner to secure higher combustion efficiency and complete burning of the mixture, resulting in a blast of burned gases of higher temperature and increased velocity.

An object of the invention embraces a method of introducing combustible gases into a combustion chamber or confined zone in a manner whereby immediate ignition of the incoming gases is obtained and a greatly accelerated flame propagation is obtained so that the burning of the gases takes place at an increased rate so that a greater quantity of combustible mixture may be admitted into the confined zone and complete combustion of the mixture attained without increasing the size of the burner.

Another object of the invention is the provision of a method of introducing combustible mixture into a burner chamber involving directing the mixture into intimate contact with an intensely hot chamber wall or lining of refractory which is heated by the burning gases to incandescence and which reflects radiant energy into the burning gases to secure higher temperatures and, hence, attain higher velocities of gases discharged through a restricted orifice in a front wall of the chamber.

Another object of the invention is the provision of a burner wherein incoming combustible gases introduced into the burner chamber are substantially instantly ignited so that burning of the gases takes place during their entire path of traverse from the mixture inlet zone to the gas discharge orifice to attain a gaseous blast of increased temperature and much higher velocity without increasing the size of the burner.

Another object of the invention resides in controlling and directing the path of the mixture introduced into a burner chamber, providing for rapid ignition and flame propagation of the mixture and causing an involute movement of the gases to increase substantially the path of traverse of the burning gases through the combustion chamber and facilitate faster and more complete combustion of the mixture.

Still a further object of the invention is the provision of a burner construction wherein an ignition zone is provided adjacent the inlet openings in a screen or wall through which combustible mixture is delivered into a combustion chamber, the walls of the ignition zone being configurated to accelerate involute movement of the burning gases as they travel through the burner chamber for discharge through a restricted orifice.

Another object of the invention is the provision of a method of burning gases in a confined zone of a burner wherein a greater volume of combustible mixture may be burned satisfactorily in the confined zone, permitting the use of smaller burners, and hence the utilization of more burners in a given space.

Another object of the invention is the provision of method and apparatus for burning combustible mixture in a confined zone whereby more quiet operation of the burner is obtained.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic elevational view illustrating the method of utilizing a burner of the invention in attenuating bodies of glass or other mineral material to fibers;

FIGURE 2 is a longitudinal sectional view through a burner embodying the invention;

FIGURE 3 is an end elevational view, partly in section, of the burner shown in FIGURE 2;

FIGURE 4 is a longitudinal sectional view of a burner illustrating a modified form of burner of the invention;

FIGURE 5 is a transverse sectional view taken substantially on the line 5—5 of FIGURE 4;

FIGURE 6 is a detailed sectional view showing the mixture inlet passage means of the burner of FIGURE 4;

FIGURE 7 is a fragmentary sectional view illustrating a modified form of burner construction;

FIGURE 8 is an elevational view of the screen or rear wall of the burner shown in FIGURE 7;

FIGURE 9 is a sectional view similar to FIGURE 7 showing a modified form of burner construction;

Figure 10:
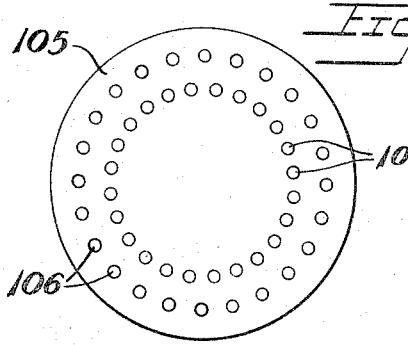
FIGURE 10 is a view of the rear wall or screen of the burner construction shown in FIGURE 9.

The burner arrangement of the present invention has particular utility as a blast-producing means for attenuating bodies or filaments of glass or other heat-softenable mineral materials to fine fibers. Referring initially to FIGURE 1 of the drawings, the fiber-forming apparatus includes a glass feeder unit 10 which is disposed beneath a forehearth 12 of a glass-melting furnace (not shown), the floor of the feeder unit 10 being provided with a plurality of orifices adapted to discharge fine streams S of molten glass. The streams are drawn to primary filaments or elongated bodies 14 by means of attenuating or feed rolls 15 which are continuously driven at a speed suitable for feeding the glass bodies or filaments 14 into a gaseous blast B at the desired rate. The rolls 15 feed the primary filaments or bodies into a guide member 17 by which they are supported as they are delivered or fed into the attenuating blast. Attenuation of the primary filaments 14 to fine fibers is accomplished by a blast emanating from a burner 20 of the present invention which is arranged to produce a blast of products of combustion or burned gases of a temperature above the softening point of the glass traveling at very high velocities. The extremities of the primary filaments 14 are continuously projected into the blast and are softened by the heat of the blast, and the softened glass is attenuated or drawn into extremely fine fibers by the force or velocity of the blast. The fibers may be collected by suitable collecting means (not shown) and the collected fibers further processed into various end products such as mats or bats or the fibers may be collected in the form of rovings or slivers from which textile yarns or threads may be formed by conventional textile methods.

The interior structure of the combustion burner of the present invention is of a character which secures higher blast temperature and a more complete burning of a combustible mixture and which is adaptable for burning a greatly increased quantity of combustible mixture in a given unit of time without increasing the volumetric factor of the combustion chamber.

One form of burner construction of the invention, illustrated in FIGURES 1 through 3, is inclusive of a shell or casing 22 preferably formed of metal and is arranged to enclose a refractory lining which defines the contour of the burner chamber. The shell or casing is formed at one end with an opening through which projects the refractory structure defining the gas discharge orifice for producing the blast. The opposite end of the shell 22 is formed with flanges 24 to which is secured a closure plate or member 26, the plate being held in place by means of bolts 28 extending into threaded openings formed in the flanges 24. A sealing gasket 27 of asbestos or other heat-resistant material may be disposed between the flanges 24 and plate 26.

The plate 26 is formed with a rearwardly extending, hollow boss portion 29 having an interior zone or chamber 30 forming a manifold adapted to receive a supply of combustible fuel-and-air mixture through a pipe 32 which is threaded into an opening 33 formed in the boss portion. It is preferable to use ordinary manufactured or natural gas, methane, propone, or other readily combustible gas as a fuel component of the mixture. The gas-air mixture is supplied to the burner at a pressure less than ten pounds per square inch and preferably within the range of from one to seven pounds per square inch.

Disposed within the metal shell 22 is a combustion chamber or confined zone 35. The combustion chamber 35 is defined by a lining of high-temperature refractory which is preferably formed in two layers 37 and 38 joined by a layer of high-temperature cement 39. The nose portion 40 of the burner is formed of high-temperature refractory and is provided with a restricted orifice 42 through which the products of combustion or burned gases from the chamber 35 are projected to form the high-temperature, high velocity blast B.

The restricted orifice 42 is preferably of elongated, generally rectangular configuration in cross section as shown in FIGURE 3, and the primary filaments or bodies 14 of glass or other fiber-forming material are projected into the blast adjacent the orifice, the filaments 14 being disposed in a row in spaced apart relation so that the extremity of each primary filament is softened by the heat of the blast and drawn into fibers. The nose portion 40 of the burner is preferably fashioned as an independent component from the refractory lining 37 in order to facilitate expansion and contraction of the refractory with a minimum liability of fracture by reason of the intense heat of the combustion within the chamber 35. The form of burner illustrated in the drawings embodies a combustion chamber of substantially circular cross section at zones rearwardly of the nose portion 40, but it is to be understood that the combustion chamber may be of substantially rectangular or oval shape in cross section.

The burner is provided with a rear wall, member or screen 45, preferably formed of refractory although the same may be formed of metal. The wall or screen 45 is provided with a central opening into which extends a cylindrical member 47 formed of refractory or metal. The member 45, which is annular in the illustrated embodiment, is provided with a circular recess 48 in communication with the manifold chamber 30 and, in effect, forms a portion of the manifold chamber receiving the fuel-and-air mixture through the pipe 32 from a supply.

The member 47 is formed with a plurality of small passages or channels 50 through which the combustible mixture in the manifold 30 may enter the central zone of the combustion chamber 35, the passages 50 forming a suitable screen to avoid ignition of combustible mixture in the supply manifold 30. The mixture is ignited and burned in the confined zone provided by chamber 35.

It has heretofore been the practice to admit the fuel-and-air mixture through passages, such as passages 50 shown in FIGURES 2 and 3, in the rear wall of the burner at the central zone of the burner. As the incoming gases are comparatively cool, the flame propagation and rate of ignition in the mixture entering the central zone of a burner is comparatively slow so that heretofore the walls of the combustion chamber adjacent or near the rear wall or fire screen of the burner were relatively cool and hence little or no burning or combustion of the fuel gas occurred at the zones or pockets adjacent the chamber walls near the fire screen. In the present invention, the member 45 is provided with an annular row of passages 52 which are adapted to convey fuel-and-air mixture from a recess 48 of the manifold 30 into the combustion chamber 35 adjacent the rear zone of the chamber walls defining the combustion chamber 35.

As particularly shown in FIGURES 2 and 3, the passageways 52 are substantially equally spaced circumferentially of the wall 45 and are arranged at an angle with respect to the longitudinal axis of the burner chamber so as to direct or impinge the incoming combustible mixture against the interior wall portion 54 of the chamber 35. As the chamber walls are heated to a very high temperature, viz., a temperature of 3000° F. or more, rendering the walls incandescent, the heat from the walls accelerates or fosters ignition of the mixture immediately upon entrance of the mixture into the chamber 35 through the passages 52 so that burning of the mixture is initiated at the entrance of the combustible mixture into the chamber.

As illustrated in FIGURE 2, the zones or surfaces 54 of the chamber wall are of concave configuration, and this curvature is blended into a convexly curved surface 56 forming a restricted zone in the chamber 35. The wall portion 56 is curved outwardly in a direction toward the orifice end of the burner and connects with or joins a wall portion 58. The cross-sectional shape of the wall portions 54, 56 and 58 is of circular configuration in the burner shown in FIGURES 2 and 3, and a wall 59 of member 40 joins the wall 58 with the walls defining the rectangular orifice 42.

The zone of reduced cross-sectional area formed in the chamber by the wall portion 56 forms, in effect, a Venturi or choke band which facilitates the flow of burning gases toward the discharge orifice 42. The spherically shaped wall portions 54 influence the travel of the burning gases along a path of involution or infolding toward the central zone or axis of the chamber 35.

The wall configuration of chamber 35 attains many advantages. The mixture entering the chamber through the peripherally arranged passages 52 is immediately ignited as the wall portions 54 are of very high temperature, a factor which promulgates rapid flame propagation and accelerated burning of the mixture. The curvature of walls 54 causes involution of the gases toward the central zone of the burner, thus increasing the path of travel of the burning gases, and, hence, a more complete burning of the mixture is attained. The gases flow through the restriction provided by the wall 56 and burning of the mixture continues in the zone bounded by walls 58 which are elevated to a very high temperature. The incandescent walls of refractory radiate energy to the burning gases, and the gases undergo great expansion so that they are discharged at an extremely high velocity through the restricted orifice 42 to produce an intensely hot, high velocity blast.

The contour or configuration of the interior walls of chamber 35 provides for increased linear travel of the burning gases through the chamber with the result that the mixture is completely burned so that a gaseous blast of extremely high temperature of 3000° F. or more is discharged through the orifice 42. It has been found that, by introducing combustible mixture adjacent the rear portions of the walls of chamber 35, immediate ignition of the mixture takes place and burning of the gases obtains throughout the entire length of the burner chamber. Through this arrangement a substantially greater quantity of combustible mixture may be satisfactorily and completely burned within the confined zone provided by the chamber 35 than has heretofore been possible with burners wherein the combustible mixture is introduced through passages disposed only at the central zone of the rear wall of the burner. While the reasons for the increased efficiency and capacity of the burner to completely burn a greater amount of mixture in a given time may not be completely understood, it is believed that, by reason of initiating ignition of the mixture adjacent the lateral walls of the chamber at the zone of entrance of the mixture into the chamber, the flame propagation or rapidity of burning is greatly increased and at the same time the pocket of unburned gas which would otherwise be formed peripherally adjacent a rear lateral wall of a conventional burner is completely eliminated.

By reason of the increased burning capacity of the burner of this invention, it has been found feasible to supplement the mixture delivered through the passages 52 with mixture delivered through the passages 50 arranged centrally of the rear wall member 45 of the burner as shown in FIGURE 2. By utilizing the circumferentially arranged passages 52 and the central passages 50, a large quantity of combustible mixture may be introduced into and satisfactorily burned in the chamber 35. By way of comparison a standard or conventional type burner of substantially the same size as the burner of this invention showed relatively poor and incomplete combustion at a fuel gas flow rate of 540 cubic fee per hour with the fuel-and-air mixture entering the burner chamber under a manifold pressure of three pounds per square inch. In a burner of this invention of the same size, satisfactory and complete burning of a combustible mixture was attained with a fuel gas flow rate of 860 cubic feet per hour, the fuel-and-air mixture entering the chamber under a manifold pressure of six and one-half pounds per square inch.

The flame of the burning gases in the chamber or confined zone 35 elevates the temperature of the refractory to incandescence, and radiant energy derived from the intensely hot refractory walls is effective on the burning gases to further increase the efficiency of combustion within the burner chamber. As the wall portions 54 are concave and wall portions 56 joined therewith are convex, there is provided a smooth path, enhancing the flow of the gases through the burner and at the same time providing a relatively long path of travel of the gases, facilitating more complete burning of the mixture.

A modified form of burner construction of the invention is illustrated in FIGURES 4, 5 and 6. The burner 60 is formed with a metal shell 22' enclosing a refractory layer 38'. A second refractory layer or lining 62 within the layer 38' defines the combustion chamber 65. The forward end of the burner construction 60 is provided with a member 40' formed with a restricted orifice 42' through which burned gases or products of combustion from the chamber or confined zone 65 are projected as a high velocity blast. In this form of the invention, the chamber 65 is bounded by a substantially cylindrical wall or surface 66 of the refractory lining 62 which curves inwardly as at 67 and at its end zone joins a wall 59' which terminates in a rectangular shape defining the orifice 42'. A member 69 is secured to the rear portion of the metal shell 22' and provides a manifold 70 which receives a combustible mixture of fuel gas and air from a supply through a pipe 71.

The burner shown in FIGURES 4 through 6 embodies an arrangement for introducing combustible mixture from the manifold 70 into the combustion chamber or confined zone 65 adjacent the cylindrical wall portion 66 of the refractory 62 of the combustion chamber. In this construction a rear wall or screen for the burner chamber 65 is formed by generally annular or ring-shaped members 73 and 74 which may be formed of metal as they are disposed in a zone which is comparatively cool by reason of the incoming gases. The wall member 73 is formed with an exterior cylindrical surface which fits within a rearwardly extending portion of the refractory lining 38' and may be cemented thereto by high-temperature cement. The member 73 is formed with a frusto-conically shaped inner surface 75. Disposed within the zone bounded by the surface 75 is an annular member 74 whose exterior surface is of generally frusto-conical shape. The frusto-conically shaped surface 80 is formed with circumferentially arranged, spaced projections 82 which are of triangular or wedge-like configuration as shown in FIGURE 6. The spaces 83 between the projections 82 provide slots or passages of substantially rectangular cross section through which combustible mixture of fuel gas and air is conveyed into the chamber 65. It will be apparent from FIGURE 4 that the zones of entrance of the passages or slots 83 into the combustion chamber 65 are adjacent the cylindrical wall 66 of the chamber; and as the passages are angularly arranged, the combustible mixture is delivered substantially in the form of an annular, frusto-conically shaped sheet of gas impinging against the wall 66, the gases being immediately ignited by the heated wall 66 so that burning of the mixture is initiated at the zone of entrance of the mixture peripherally of the combustion chamber. Through this arrangement, burning of the mixture takes place through the full length of the combustion chamber, the combustion being accelerated by heat energy radiated from the incandescent walls of the chamber, thus avoiding or eliminating pockets or zones of unburned gases in the chamber.

The present invention facilitates the burning or combustion of the mixture at a rate so rapid that a greater quantity of mixture may be introduced into and burned in the chamber than has heretofore been possible with other burners of a character wherein the fuel-and-air mixture was introduced only at passages in the central zone of the rear wall of the burner. Thus in this form of the invention, additional combustible mixture may be advantageously introduced at the central zone of the rear wall of the burner in addition to the mixture delivered through the passages 83. To this end, a member 85 mounted in an opening bounded by a wall 86 of the annular member 74 may be provided with a plurality of small-diameter passages or orifices 87 through which combustible mixture may be delivered into the central or axial zone of the combustion chamber 65. Through this arrangement, the mixture introduced at the central zone of the chamber is ignited by the burning gases surrounding the central zone, and thus burning of the mixture takes place throughout the entire cross-sectional area of the combustion chamber and throughout its length whereby the entire volumetric content of the chamber is utilized to foster efficient and complete combustion of the fuel within the chamber.

The members 73 and 74 may be secured in fixed relation by suitable means. As particularly shown in FIGURE 5, certain of the projections 82 are welded together as shown at 89.

FIGURES 7 and 8 are illustrative of a burner embodying a modified arrangement for delivering combustible mixture into a burner having a combustion chamber 65' of the general character and shape shown in FIGURE 4. In this form, the rear of the burner chamber 65' is bounded by a member or wall 92 which is of disk-like shape as shown in FIGURE 8. The member 92 is formed with a circumferential row of gas passages 94 for conveying combustible mixture from the manifold chamber 70' to the combustion chamber 65'. As particularly shown in FIGURE 7, the passages 94 are angularly disposed with respect to the longitudinal axis of the burner and, as illustrated, are arranged at an inclined angle of about 45°. It is to be understood that the passages may be disposed at other angles if so desired. The peripheral spacing of the angularly arranged passages 94 is illustrated in FIGURE 8, the passages being preferably spaced equal distances apart peripherally of the disk-like member 92 in order to obtain a substantially uniform distribution of the fuel mixture around the interior wall 66' of the combustion chamber. Through this arrangement, the incoming mixture is impinged against the intensely hot walls of the chamber and ignition of the mixture takes place immediately upon the entrance of the gas into the chamber so that burning ensues throughout the entire length of the burner chamber. By reason of this factor, substantially the entire wall area bounding the chamber 65' is heated to 3000° F. or more, that is, to a temperature of incandescence, and the intensely hot walls radiate energy into the burning gases to enhance the rapidity of flame propagation and foster complete combustion within the chamber or confined zone 65'. The burned gases are discharged through a restricted orifice of the same character as that shown in FIGURE 4.

FIGURE 9 is a fragmentary sectional view of a burner of the type shown in FIGURE 4 illustrating another arrangement of orifices or passageways for conveying combustible mixture from a manifold to a combustion chamber. The combustion chamber 65" is separated from a manifold chamber 70" by a member or screen 100 which forms the rear wall of the combustion chamber 65". The member 100 is provided with an annular row of circumferentially spaced passageways 102 disposed in substantial parallelism with each other and with the longitudinal axis of the burner. The passageways 102 are spaced inwardly a short distance from the cylindrical wall 66" so that the gaseous mixture is delivered in an annularly shaped zone adjacent the chamber wall 66". In this form of construction, as in the others hereinbefore described, ignition of the mixture takes place at the zone of entrance of the mixture into the chamber 65" and is accelerated by the heat radiated from the intensely hot refractory surface 66". As the passages 102 are disposed circumferentially or peripherally of the member 100, the incoming mixture is distributed through the interior of the chamber 65" so that burning takes place throughout the entire length of the chamber 65".

FIGURE 10 illustrates a modified form of rear wall or screen member for a burner construction. In this form, the wall member 105 is provided with two annular rows of passages 106 and 107. The passages of each row are in circumferentially spaced relation, the passages 107 of the innermost row preferably being arranged in staggered relation with respect to the passages 106 in the other row to secure satisfactory distribution of the mixture. The arrangement of passages 106 and 107 for conveying combustible mixture from the manifold chamber to the combustion chamber may be advantageously utilized where it is desired to introduce comparatively large quantities of mixture into the combustion chamber and to initially distribute the incoming mixture over a larger area of the combustion chamber or burning zone.

In this arrangement of passages, the incoming mixture entering through the passages 106 is ignited immediately upon contact with the hot refractory wall of the combustion chamber. During burning, these gases expand inwardly and ignite the combustible mixture entering through the passages 107 so that there is a constant involution, infolding movement or turbulence of the burning gases toward the central zone which facilitates flame propagation and more complete burning of the mixture as it travels toward the discharge end of the burner.

Figure 11:
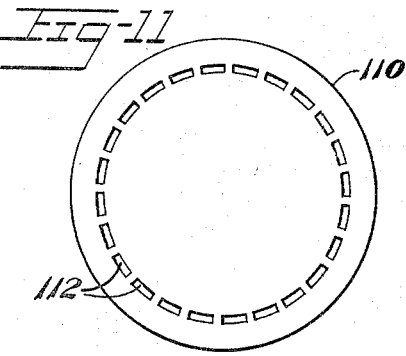
FIGURE 11 is a view of a screen illustrating another form of mixture inlet passage means.

FIGURE 11 is illustrative of a wall or screen member for a burner chamber showing another arrangement of mixture inlet passages. The member or wall 110 is formed with an annular row of passages 112, and each of the passages is of elongated, substantially rectangular cross-section. This form of passage arrangement directs incoming gas in the zone adjacent the inner wall of the combustion chamber so that burning takes place in substantially the same manner as in the other forms of the invention.

Figure 12:
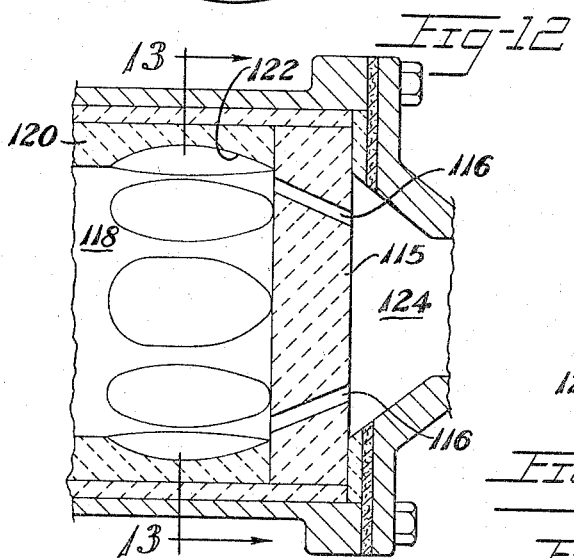
FIGURE 12 is a fragmentary sectional view of a burner illustrating another form of combustion chamber.
Figure 13:
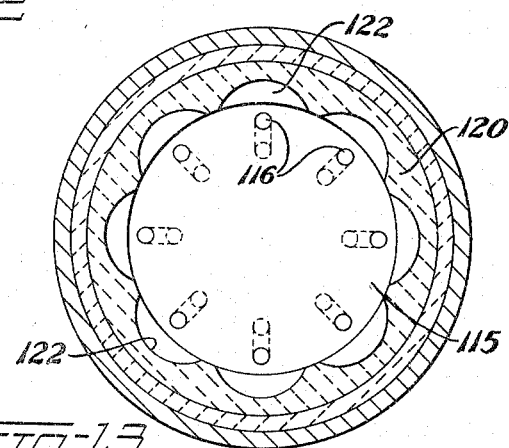
FIGURE 13 is a transverse, sectional view taken substantially on the line 13—13 of FIGURE 12.

FIGURES 12 and 13 illustrate another form of the invention. In this form, the rear wall 115 of the combustion chamber is provided with circumferentially spaced gas passages 116 which are angularly disposed and inclined toward the interior wall of the combustion chamber 118. The wall portion of the refractory lining 120 defining the combustion chamber is formed with a plurality of partially ovoid-shaped recesses or depressions 122, each of said depressions being preferably aligned with one of the gas inlet passages 116 as shown in FIGURE 13 conveying gas from a manifold chamber 124 into the combustion chamber 118. The ovoidal shape of the recesses 122 facilitates an involution or an infolding of the burning gases to foster or accelerate more rapid combustion or burning within the chamber. In this form, ignition of the incoming combustible mixture takes place at the zone of entrance of the mixture into the chamber 118 from the angularly disposed passageways 116.

Figure 14:
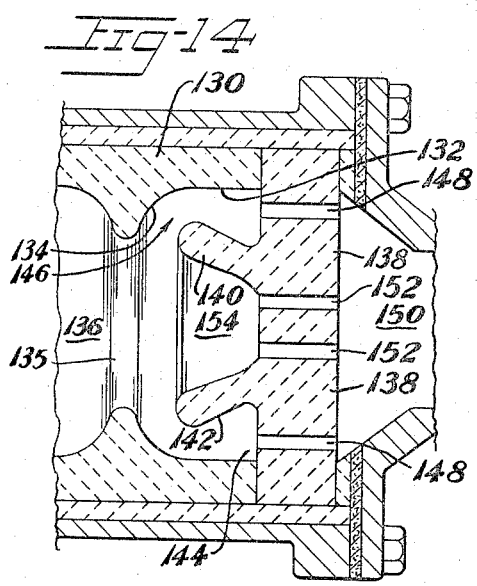
FIGURE 14 is a fragmentary sectional view showing another form of burner combustion chamber.

FIGURE 14 illustrates a further form of burner construction embodying a supplemental combustion chamber for accelerating initial ignition of the combustible mixture. The burner embodies within the metal shell a refractory lining 130 having an interior cylindrical wall portion 132 which joins with an inwardly curved surface 134, the latter being shaped to form a restricted zone or passage 135 communicating with a main combustion chamber 136.

The combustion zone of the burner is bounded at its rear portion by a wall 138 formed of high-temperature-resistant refractory. The member or wall 138 is formed with an annular projection 140 extending into the interior of the burner. The outer wall 142 of the projection 140 is shaped in the manner illustrated in FIGURE 14 to provide an annular supplemental combustion chamber or zone 144 and an annular restricted passage or zone indicated at 146.

The wall or member 138 is formed with a plurality of circumferentially arranged gas passages 148 for conveying combustible mixture from a supply manifold 150 into the annular chamber 144. In this form of burner construction, initial ignition of the mixture entering through the passages 148 takes place in the annular supplemental chamber 144, the burning gases being projected through the restricted passage 146 and through the passage 135 into the main combustion chamber 136. The burning gases from the ignition chamber 144 move toward the central zone of the burner which establishes a thorough mixing of the burning gases, enhancing complete burning of the mixture. The wall or member 138 may be provided with a centrally arranged group of openings or passages 152 for admitting additional combustible mixture from the manifold 150 into a second supplemental or ignition chamber 154 defined by the inner wall of the annular projection 140. In this form of burner construction, the member 138 is preferably formed of refractory material as the annular projection 140 defining an inner wall 132 of the ignition chamber 144 and an outer wall of chamber 154 becomes intensely hot by reason of the ignition of and burning of mixture in these ignition chambers. As the projection 140 is heated to a very high temperature by the burning gases in the ignition chambers, the mixture entering the chambers 144 and 154 through the passages 148 and 152, respectively, is immediately ignited and the burning gases from the chambers 144 and 154 join or mix as they move through the zone 135 into the main chamber 136 and toward the nose end of the burner for discharge through a restricted orifice of the character shown in FIGURE 4. Thus, in this arrangement ignition in the annular chamber 144 and the central chamber 154 and flame propagation through the combustible mixture are very rapid due to the initial separation of the gases into two ignition zones, ignition being further accelerated by heat energy radiated from the incandescent refractory walls. As in the other forms of construction, the entire length of the burning zones of the burner is occupied by ignited and burning combustible mixture so that full advantage of continuous burning of the mixture is attained from the point of entrance of the combustible mixture into the combustion zone.

Figure 15:
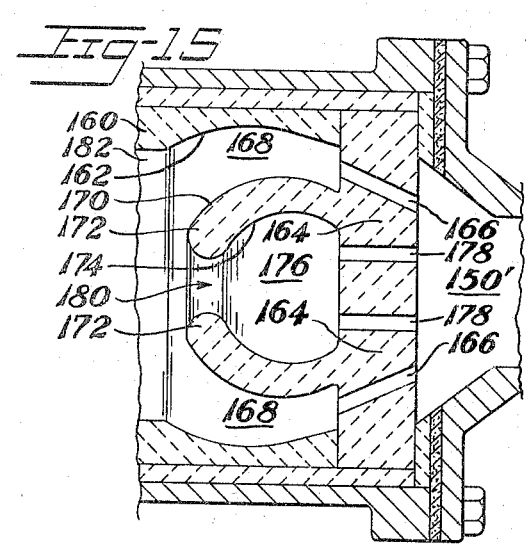
FIGURE 15 is a sectional view similar to FIGURE 14 showing a further form of combustion chamber construction.

FIGURE 15 is a fragmentary sectional view of a burner showing another arrangement of ignition and combustion zones. In this form the refractory lining 160 is provided with a concavely curved wall 162 formed adjacent the rear wall member 164. The wall member 164 is formed with a plurality of circumferentially arranged passages 166 disposed at an acute angle with respect to the longitudinal axis of the burner and through which mixture is conveyed from the supply manifold 150' into a supplemental ignition chamber 168 of annular configuration which is formed between the curved wall 162 of the refractory lining 160 and an exterior wall 170 of an annular projection 172 integrally formed on the wall 164. The inner, concave surface 174 of the annular projection 172 forms a second supplemental chamber 176, and combustible mixture is conveyed to the chamber 176 through a centrally arranged group of small passages 178. The projection 172 is formed with a restricted passage 180 which establishes communication between the supplemental chamber 176 and a main combustion chamber or zone 182. The annular chamber 168 provides an ignition zone whereby the gases entering the chamber 168 through passages 166 are immediately ignited under the influence of heat radiated from the intensely hot walls 162 and 170 which have been heated to a high temperature through the continuous burning of combustible mixture moving forwardly of the chamber 168. As the annular projection 172 is heated to a high temperature by reason of the burning gases in the central supplemental chamber 176, the gases entering the supplemental chamber 176 from the manifold 150' are immediately ignited. Hence, in this form of construction the mixture entering the ignition zones is immediately ignited and burning of the mixture obtains throughout the entire length of the combustion zones of the chamber, the burned gases being discharged through an orifice at the nose end of the burner of the character shown at 42' in FIGURE 4.

It is to be understood that, while the general cross-sectional shape of the combustion chambers or confined zones illustrated in the drawings is circular, the combustion chamber may be of generally rectangular or oval shape, and, in such instances, the mixture inlet passages having entrances adjacent the walls of the combustion chamber are arranged in a row or rows following generally the contour of the chamber wall so that the incoming combustible mixture is delivered into contact with the hot refractory wall of the chamber.

It will be apparent that in the forms of burner construction, there are no pockets or isolated areas or zones of unburned gases as ignition of the incoming combustible mixture is effected at the zones of entrance of the mixture into the combustion or ignition zones of the burner, and burning of the mixture continues throughout the entire length of the burner chamber. By this method, the combustible mixture is substantially completely burned within a confined zone so that only the intensely hot products of combustion are discharged through the burner orifice as a high velocity blast. The method makes possible the complete combustion of a large amount of gaseous combustible mixture so that a blast of higher temperature and of increased velocity is obtained over prior burners without increasing the size of the burners.

It is apparent that, within the scope of the invention, modifications and different arrangements may be made other than are herein disclosed, and the present disclosure is illustrative merely, the invention comprehending all variations thereof.

I claim:
1. A burner of the character disclosed including, in combination, an elongated burner casing, a lining of refractory material in said casing defining the lateral surface of a combustion zone, a member disposed at the rear of the burner and forming a rear wall of the combustion zone, said member being formed of refractory and having an annular projection extending into the combustion zone, said annular projection forming with the lateral surface an annular ignition chamber, a mixture supply manifold disposed at the opposite side of the member, said member having a plurality of passages formed therein for conveying combustible mixture from said manifold to the annular ignition chamber, said mixture adapted to be ignited at the zone of entrance of the mixture into the ignition chamber, said refractory lining having an inwardly extending circular portion defining a passage of reduced cross-sectional area centrally in said combustion zone and through which the burning gases flow from the annular ignition chamber, and a restricted orifice in the forward end of the burner through which products of combustion are discharged from the combustion zone.

2. A burner of the character disclosed including, in combination, an elongated burner casing, a lining of refractory material in said casing defining the lateral walls of a combustion zone, a member disposed at the rear of the burner and forming a rear wall of the combustion zone, said wall being formed of refractory and having an annular projection extending into the combustion zone, said annular projection forming with the lateral walls an annular ignition chamber adjacent the rear wall, a mixture supply manifold disposed at the opposite side of the wall, said wall having a group of passages formed therein for conveying combustible mixture from said manifold to the annular ignition chamber formed in said combustion zone, said mixture adapted to be ignited at the zone of entrance of the mixture into the ignition chamber, said refractory lining having an inwardly extending circular portion defining a passage of reduced cross-sectional area in said combustion zone and through which are directed the burning gases from the annular ignition chamber, a restricted orifice in the forward end of the burner through which the burned gases are discharged from the combustion zone, the interior surface of the annular projection defining a second ignition chamber disposed centrally of the burner, a second group of passages formed in the central zone of said rear wall for conveying combustible mixture from the manifold into the second ignition chamber, said mixture being ignited at the zone of entrance of the mixture into the second ignition chamber, the burning gases from both of said ignition chambers being mixed together as they move forwardly through the combustion zone toward the restricted orifice.

3. A burner of the character disclosed including, in combination, an elongated burner casing, a lining of refractory material in said casing defining the lateral wall surface of a combustion zone, a member formed of refractory disposed at the rear of the burner and forming a rear wall of the combustion zone, a hollow projection of refractory extending from the rear wall into the combustion zone, the exterior surface of the hollow projection forming with the lateral wall surface a supplemental combustion chamber, a mixture supply manifold disposed at the opposite side of the member, said member having a plurality of passages formed therein for conveying combustible mixture from said manifold to the supplemental combustion chamber, said mixture adapted to be ignited at the zone of entrance of the mixture into the supplemental chamber, said refractory lining having an inwardly extending circular portion defining a passage of reduced cross-sectional area centrally in said combustion zone and through which the burning gases flow from the supplemental chamber, and a restricted orifice in the forward end of the burner through which products of combustion are discharged from the combustion zone.

4. A burner of the character disclosed including, in combination, an elongated burner casing, a lining of refractory material in said casing defining the lateral wall surface of a combustion zone, a member disposed at the rear of the burner and forming a rear wall of the combustion zone, said member being formed of refractory and having a hollow projection extending into the combustion zone, the exterior surface of the hollow projection forming with the lateral wall surface a supplemental combustion chamber, the interior surface of the hollow projection defining a second supplemental chamber, a mixture supply manifold disposed at the opposite side of the member, said member having passages formed therein for conveying combustible mixture from said manifold to the supplemental chambers, said mixture adapted to be ignited at the zones of entrance of the mixture into the supplemental chambers, said refractory lining having an inwardly extending circular portion defining a passage of reduced cross-sectional area centrally in said combustion zone and through which the burning gases flow from the supplemental chambers, and a restricted orifice in the forward end of the burner through which products of combustion are discharged from the combustion zone.

5. A burner of the character disclosed including, in combination, an elongated burner casing, a lining of refractory material in said casing defining the lateral wall surface of a combustion zone, a member formed of refractory disposed at the rear of the burner and forming a rear wall of the combustion zone, a hollow projection of refractory extending from said wall into the combustion zone, the exterior surface of the hollow projection forming with the lateral wall surface a supplemental chamber adjacent the rear wall, a mixture supply manifold disposed at the opposite side of the wall, said wall having a first group of passages formed therein for conveying combustible mixture from said manifold to the supplemental chamber, said mixture adapted to be ignited at the zone of entrance of the mixture into the supplemental chamber, the interior surface of the hollow projection defining a second supplemental chamber disposed centrally of the burner, a second group of passages in the central zone of said rear wall for conveying combustible mixture from the manifold into the second supplemental chamber, said mixture being ignited at the zone of entrance of the mixture into the second supplemental chamber, said refractory lining having an inwardly extending circular portion defining a passage or reduced cross-sectional area in said combustion zone and through which are directed the burning gases from both supplemental chambers, the burning gases from both supplemental chambers being mixed together as they move through the combustion zone, and a restricted orifice in the forward end of the burner through which the products of combustion are discharged from the combustion zone.

6. A burner of the character disclosed including, in combination, an elongated burner casing, a lining of refractory material in said casing defining the lateral wall surface of a combustion zone, a member disposed at the rear of the burner and forming a rear wall of the combustion zone, said wall being formed of refractory and having an annular projection extending into the combustion zone, said annular projection forming with the lateral wall surface a supplemental chamber, a mixture supply manifold disposed at the opposite side of the wall, said wall having a group of passages formed therein for conveying combustible mixture from said manifold to the supplemental chamber, the interior surface of the annular projection defining a second supplemental chamber disposed centrally of the burner, a second group of passages in the central zone of said rear wall for conveying combustible mixture from the manifold into the second supplemental chamber, said refractory lining having an inwardly extending circular portion defining a passage of reduced cross-sectional area in said combustion zone and through which are directed the burning gases from the supplemental chambers, and a restricted orifice in the forward end of the burner through which the burned gases are discharged from the combustion zone.

7. A burner construction of the character disclosed including an elongated casing, a refractory lining within the casing defining the lateral wall of an elongated combustion chamber, means defining a rear wall of the combustion chamber, said means being formed of two ring-like members and a central member extending into the innermost ring-like member, said ring-like members being formed respectively with reciprocably shaped, frusto-conically configurated surfaces, a plurality of circumferentially spaced embossments on the frusto-conically configurated surface of one of said ring-like members, said embossments adapted to engage the frusto-conically configurated surface of the other of said ring-like members to form a plurality of slots for admitting combustible mixture from a supply into said combustion chamber, said slots being disposed to direct combustible mixture along the refractory wall of said combustion chamber adjacent the zone of entrance of the mixture into the chamber, said central member having a plurality of passages for admitting combustible mixture into the axial zone of the combustion chamber, and a restricted orifice in the forward portion of the burner through which gases of combustion are discharged from the chamber as a high velocity blast.

8. A burner construction of the character disclosed including an elongated casing, a refractory lining within the casing defining the lateral wall of an elongated combustion chamber, means at the rear of the burner defining a rear wall of the combustion chamber, a combustible mixture supply manifold in said casing, a plurality of circumferentially spaced passages formed in said rear wall wherein each of the passages is disposed at an angle with respect to the longitudinal axis of the burner, the lateral wall of the chamber formed by the refractory lining being configurated with a plurality of circumferentially spaced ovoidal-shaped recesses wherein each recess is aligned with one of the circumferentially spaced passages whereby mixture admitted into the combustion chamber through the passages is directed into the ovoidal-shaped recesses, the mixture being adapted to be ignited at the zone of entrance of the mixture into the chamber, said ovoidal-shaped recesses being arranged to cause an involution of the burning gases toward the central zone of the chamber, and a restricted orifice formed in the forward portion of the burner through which the products of combustion are discharged from the chamber.

References Cited by the Examiner
UNITED STATES PATENTS

| | | | |
|---|---|---|---|
| 1,769,821 | 7/1930 | Barber | 158—99 |
| 1,773,002 | 8/1930 | Hunt. | |
| 2,367,119 | 1/1945 | Hess | 158—116 X |
| 2,489,244 | 11/1949 | Stalego | 158—99 X |
| 2,515,845 | 7/1950 | Van den Bussche | 110—28 |
| 2,762,428 | 9/1956 | Blaha | 158—116 X |
| 3,089,538 | 5/1963 | Labino | 158—99 |

FREDERICK L. MATTESON, Jr., *Primary Examiner.*

H. B. RAMEY, *Assistant Examiner.*

Disclaimer and Dedication 3,320,999.—*Charles J. Stalego,* Newark, Ohio. INTERNAL COMBUSTION BURNER. Patent dated May 23, 1967. Disclaimer and Dedication filed, Oct. 11, 1983, by the assignee, *Owens-Corning Fiberglas Corp.*

Hereby disclaims and dedicates to the Public the entire remaining term of said patent.

[*Official Gazette November 29, 1983.*]